US008249451B2

(12) United States Patent
Lee et al.

(10) Patent No.: US 8,249,451 B2
(45) Date of Patent: Aug. 21, 2012

(54) METHODS FOR CHARACTERIZING OPTICAL SWITCHES AND MULTIPLEXERS/DEMULTIPLEXERS

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 794 days.

(21) Appl. No.: 12/169,883

(22) Filed: Jul. 9, 2008

(65) Prior Publication Data
US 2009/0046738 A1 Feb. 19, 2009

Related U.S. Application Data

(60) Provisional application No. 60/956,311, filed on Aug. 16, 2007.

(51) Int. Cl.
*H04B 10/00* (2006.01)
(52) U.S. Cl. ............ 398/57; 398/50; 398/45; 398/56
(58) Field of Classification Search ........... 398/45–57
See application file for complete search history.

(56) References Cited

U.S. PATENT DOCUMENTS

| | | | | |
|---|---|---|---|---|
| 5,206,822 A * | 4/1993 | Taylor | ............................ | 708/607 |
| 5,267,185 A * | 11/1993 | Akabane et al. | .............. | 708/520 |
| 5,878,424 A * | 3/1999 | Dooling et al. | ........................ | 1/1 |
| 5,905,666 A * | 5/1999 | Hoffman et al. | ................ | 700/99 |
| 5,987,067 A * | 11/1999 | Song | .............................. | 375/253 |
| 6,243,734 B1 * | 6/2001 | Doshi et al. | ..................... | 708/607 |
| 6,434,542 B1 * | 8/2002 | Farmen et al. | .................... | 706/45 |
| 6,466,343 B1 * | 10/2002 | Lahat et al. | ....................... | 398/82 |
| 6,674,754 B1 * | 1/2004 | Ofek | ................................ | 370/389 |
| 6,763,192 B1 * | 7/2004 | Jagannathan | ...................... | 398/54 |
| 6,799,194 B2 * | 9/2004 | Grosz et al. | ..................... | 708/446 |
| 6,982,945 B1 * | 1/2006 | Gossett | ............................ | 370/208 |
| 7,009,991 B2 * | 3/2006 | Shachar et al. | ................. | 370/436 |
| 7,039,318 B2 * | 5/2006 | Graves | .............................. | 398/81 |
| 7,106,966 B1 * | 9/2006 | Lalonde et al. | ................... | 398/46 |
| 7,107,335 B1 * | 9/2006 | Arcieri et al. | ................... | 709/224 |

(Continued)

FOREIGN PATENT DOCUMENTS
CN 1705292 A 12/2005
(Continued)

OTHER PUBLICATIONS

Imajuku, W., et al., "Routing Extensions to Support Network Elements with Switching Constraint," CCAMP Working Group, Internet-Draft, Updates: RFC 4202, draft-imajuku-ccamp-rtg-switching-constraint-02.txt, Jul. 2007, 10 pgs.

(Continued)

*Primary Examiner* — Agustin Bello
(74) *Attorney, Agent, or Firm* — Conley Rose, P.C.; Grant Rodolph; Brandt Howell

(57) ABSTRACT

A network component comprising at least one processor configured to implement a method comprising creating a port restriction matrix comprising a plurality of port restrictions, and compressing the port restriction matrix. Included is a method comprising establishing a port wavelength restriction data for an optical component, establishing a port connectivity data for the optical component, and transmitting the port wavelength restriction data and the port connectivity data to a path computation element. Also included is an apparatus comprising a path computation client configured to communicate data to a path computation element, wherein the data comprises a port restriction data.

30 Claims, 7 Drawing Sheets

U.S. PATENT DOCUMENTS

| | | | |
|---|---|---|---|
| 7,120,356 B2* | 10/2006 | Graves et al. | 398/9 |
| 7,190,900 B1* | 3/2007 | Best et al. | 398/54 |
| 7,212,739 B2* | 5/2007 | Graves et al. | 398/5 |
| 7,474,853 B2* | 1/2009 | Best et al. | 398/51 |
| 7,542,675 B1* | 6/2009 | Graves et al. | 398/45 |
| 7,594,154 B2* | 9/2009 | Vedantham et al. | 714/752 |
| 7,664,018 B2* | 2/2010 | Warren et al. | 370/230 |
| 7,725,859 B1* | 5/2010 | Lenahan et al. | 716/119 |
| 7,808,896 B2* | 10/2010 | Haas | 370/230 |
| 2005/0207442 A1* | 9/2005 | Zoest et al. | 370/465 |
| 2007/0206946 A1* | 9/2007 | Beshai | 398/4 |
| 2008/0198751 A1 | 8/2008 | Li | |
| 2009/0046738 A1* | 2/2009 | Lee et al. | 370/464 |
| 2011/0052191 A1* | 3/2011 | Beshai | 398/52 |

FOREIGN PATENT DOCUMENTS

| | | |
|---|---|---|
| CN | 101001172 A | 7/2007 |
| EP | 1237392 A2 | 9/2002 |
| JP | 2002152252 A | 5/2002 |

OTHER PUBLICATIONS

Kompella, K., et al., "OSPF Extensions in Support of Generalized Multi-Protocol Label Switching (GMPLS)," IETF Network Working Group, RFC 4203, Oct. 2005, 11 pgs.

Bernstein, G., et al., "Framework for GMPLS and PCE Control of Wavelength Switched Optical Networks (WSON)," IETF Network Working Group, Internet Draft, draft-ietf-ccamp-wavelength-switched-framework-01.txt, Oct. 31, 2008, 34 pages.

Feuer, Mark D., et al., "Routing power: A Metric for Reconfigurable Wavelength Add/Drops," OFC 2002/Tuesday Afternoon, pp. 156-158.

Tang, J. M., et al., "Wavelength-Routing Capability of Reconfigurable Optical Add/Drop Multiplexers in Dynamic Optical Networks," Journal of Lightwave Technology, vol. 24, No. 11, Nov. 2006, pp. 4296-4303.

Goh, T., et al., "Four-Degree Hub Switch Module Using Multi-Chip Planar Lightwave Circuit Integration Technology for Transparent ROADM Ring Interconnection," Optical Society of America, 2006, 3 pgs.

Ghelfi, P., et al., "Optical Cross Connects Architecture With per-Node Add&Drop Functionality," Optical Society of America, 2006, 6 pgs.

Eppstein, David, "Arboricity and Bipartite Subgraph Listing Algorithms," Department of Information and Computer Science, University of California, Tech Report 94-11, Feb. 24, 1994, 9 pgs.

Hui, Joseph Y., "Switching and Traffic Theory for Integrated Broadband Networks," Kluwer Academic Publishers, 1990, Chapters 3 and 11, 35 pages.

Foreign Communication From a Related Counterpart Application—International Search Report and Written Opinion, PCT/CN2008/071912, Oct. 30, 2008, 8 pages.

"Series G: Transmission Systems and Media, Digital Systems and Networks, Digital Terminal Equipment—General, Network Node Interface for the Synchronous Digital Hierarchy (SDH)," ITU-T G.707/ Y.1322, Jan. 2007, 196 pages.

"Series G: Transmission Systems and Media, Digital Systems and Networks, Digital Terminal Equipments—General, Interfaces for the Optical Transport Network (OTN)," ITU-T G. 709/Y.1331, Mar. 2003, 118 pages.

"Series G: Transmission Systems and Media, Digital Systems and Networks, Digital Terminal Equipments—General, Interfaces for the Optical Transport Network (OTN)," ITU-T G.709/Y.1331 Amendment 2, Nov. 2007, 16 pages.

"Series G:Transmission Systems and Media, Digital Systems and Networks, Digital Terminal Equipments—General, Interfaces for the Optical Transport Network (OTN)," ITU-T G. 709/ Y.1331 Corrigendum 1, Jul. 2010, 24 pages.

"Series G: Transmission Systems and Media, Digital Systems and Networks, Digital Sections and Digital Line System-Optical Fibre Submarine Cable Systems, Forward Error Correction for High Bit-Rate DWDM Submarine Systems," ITU-T G. 975.1, Feb. 2004, 58 pages.

"Series G: Transmission Systems and Media, Digital Systems and Networks, Digital Sections and Digital Line System—Optical Fibre Submarine Cable Systems, Forward Error Correction for High Bit-Rate DWDM Submarine Systems," ITU-T G.975.1 Corrigendum 1, Feb. 2006, 8 pages.

"Series G: Transmission Systems and Media, Digital Systems and Networks, Optical System Design and Engineering Considerations," Itu-T G. Sup 39, Feb. 2006, 92 pages.

Berger, L., "Generalized Multi Protocol Label Switching (GMPLS) Signaling Functional Description," RFC 3471, Jan. 2003, 31 pages.

Bernstein, G., et al., "Modeling WDM Wavelength Switching Systems for Use in Automated Path Computation," http://www.grotto-networking.com/wson/ModelingWSONswitchesV2a.pdf, Jun. 2008, 7 pages.

Bernstein, G., et al., "Shared Backup Mesh Protection in PCE-Based WSON Networks," iPOP 2008, http://www.grotto-networking.com/wson/iPOP2008_WSON-shared-mesh-poster.pdf, Jun. 5-6, 2008, 2 pages.

Bernstein, G., et al., "Routing and Wavelength Assignment Information Encoding for Wavelength Switched Optical Networks," draft-ietf-ccamp-rwa-wson-encode-00.txt, Dec. 18, 2008, 42 pages.

Bernstein, G., Ed., et al., "Framework for GMPLS and PCE Control of Wavelength Switched Optical Networks (WSON)," draft-ietf-ccamp-wavelength-switched-framework-00.txt, May 13, 2008, 68 pages.

Katz, D., et al., "Traffic Engineering (TE) extensions to OSPF Version 2," RFC 3630, Sep. 2003, 14 pages.

Kompella, K., Ed., et al., "Intermediate System to Intermediate System (IS-IS) Extensions in Support of Generalized Multi-Protocol Label Switching (GMPLS)," draft-ietf-isis-rfc4205bis-00.txt, Nov. 2006, 10 pages.

Li, T., et al., "IS-IS Extensions for Traffic Engineering," draft-ietf-isis-te-bis-00.txt, Aug. 2005, 22 pages.

Papadimitriou, D., et al., "Generalized Multi-Protocol Label Switching (GMPLS) Signaling Extensions for G. 709 Optical Transport Network Control," RFC 4328, Jan. 2006, 23 pages.

Roorda, P., et al., "Evolution to Colorless and Directionless ROADM Architectures," OFC/NFOEC, 2008, 3 pages.

Smit, H., et al., "Intermediate System to Intermediate System (IS-IS) Extensions for Traffic Engineering (TE)," RFC 3784, Jun. 2004, 13 pages.

Enablence, "40-Channell Ultra-Low-Powercompact PLC-Based ROADM Subsystem," Enablence Technologies, Inc., 2010. Retrieved Dec. 27, 2011 from http://www.enablence.com/media/mediamanager/pdf/374-enablence-rl-article-40chplcroadm.pdf.

* cited by examiner

Asymmetric connectivity blocks with separate egress port/wave length constraints

METHODS FOR CHARACTERIZING OPTICAL SWITCHES AND MULTIPLEXERS/DEMULTIPLEXERS

CROSS-REFERENCE TO RELATED APPLICATIONS

The present application claims priority to U.S. Provisional Patent Application Ser. No. 60/956,311 filed Aug. 16, 2007 by Lee et al. and entitled "Methods of Characterizing Optical Switches and Multiplexers/Demultiplexers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. To implement RWA, various NE related information can be forwarded from a Path Computation Client (PCC), such as an NE, and received and processed at a Path Computation Element (PCE). Such RWA information may include restrictions information for WSON optical switching elements, such as port connection configuration or port connectivity, port wavelength restrictions, or both. Such RWA information may be forwarded using standard or available network protocols.

SUMMARY

In one embodiment, the disclosure includes a network component comprising at least one processor configured to implement a method comprising creating a port restriction matrix comprising a plurality of port restrictions, and compressing the port restriction matrix.

In another embodiment, the disclosure includes a method comprising establishing a port wavelength restriction data for an optical component, establishing a port connectivity data for the optical component, and transmitting the port wavelength restriction data and the port connectivity data to a path computation element.

In yet another embodiment, the disclosure includes an apparatus comprising a path computation client configured to communicate data to a path computation element, wherein the data comprises a port restriction data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for representing port restrictions in network components, such as optical switch elements, comprising a plurality of ports. The port restrictions may comprise port connectivity, port wavelength restrictions, or both. The port connectivity may be represented using a connectivity matrix in which the individual elements indicate the connectivity between the ports. The wavelength restrictions may comprise the number of wavelengths supported by the ports, the ranges of wavelengths that are supported by the ports, or both. The port restrictions may be embodied as at least one matrix, which may be compressed to efficiently represent the common elements within the matrix. The port restrictions may be forwarded to a PCE to enable RWA in a WSON.

Figure 1:
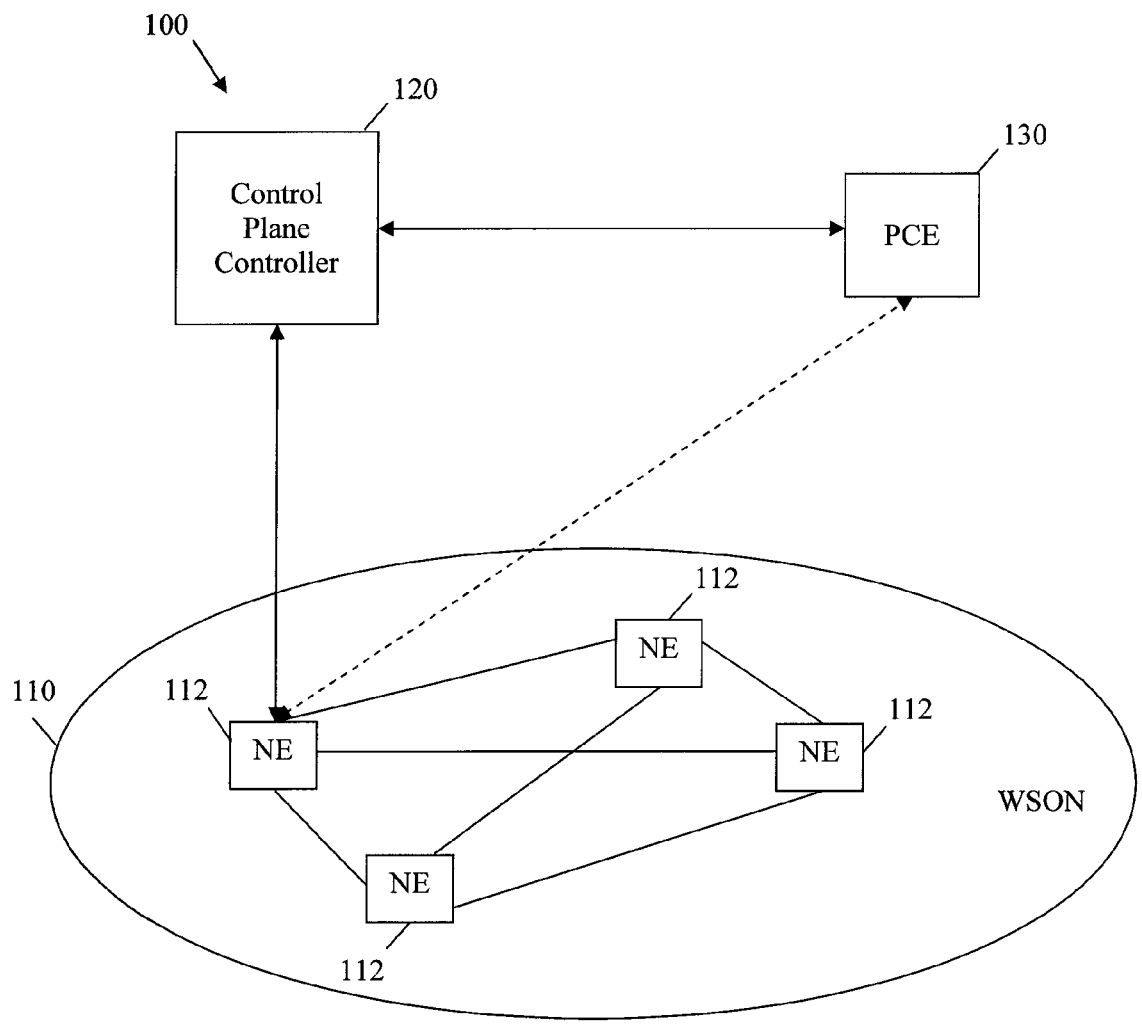
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112, also referred to as nodes, may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combination thereof. However, it may be advantageous for at least some of the NEs 112 to lack such converters as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combination thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add port may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength. The NE may also comprise at least one colorless port that may be an ingress port or an egress port, which may receive or transmit, respectively, the optical signal at any one of an arbitrary number of wavelengths.

The number of line side ingress ports and the line side egress ports may determine the degree of the NE 112. For example, an NE 112 that comprises one line side ingress port and one line side egress port may have a degree of two. An NE 112 that comprises more than one line side ingress port or more than one line side egress port may have a degree greater than two, such as a WSS or an OXC. Further, the OXC may have full port connectivity such that all the ingress ports may be connected to all the egress ports of the OXC. In some instances, the ROADMs, WSSs, and OXCs may have an equal number of ingress ports and egress ports. Alternatively, the ROADMs, WSSs, and OXCs may have different numbers of ingress ports and egress ports and, as such, their connectivity matrices may be asymmetrical.

Some of the optical switch based NE's characteristics are shown in Table 1 below.

TABLE 1

| Characteristics of Optical Switches. | | | | | | |
|---|---|---|---|---|---|---|
| Network Function | Node Degree | Subsystems per Node | Add/Drop Ports | Add/Drop Channels | Colorless | Wavelengths per Port |
| Type I ROADM | 2 | Number: 2 Size: 1x(N + 1) | Up to N | Up to N | No | No |

TABLE 1-continued

Characteristics of Optical Switches.

| Network Function | Node Degree | Subsystems per Node | Add/Drop Ports | Add/Drop Channels | Colorless | Wavelengths per Port |
|---|---|---|---|---|---|---|
| Type II ROADM | 2 | Number: 2 Size: 1x(N + 1) | Up to N | Up to N | Yes | No |
| Wavelength Selective Switch (WSS) | 2 | Number: 2 Size: 1xM | Up to M-1 | Up to N | Yes | Yes |
| | D | Number: 2(D + 1) Size: 1x(D + 1) | 1 | | | |
| Optical Cross connect (OXC) | D | Number: 1 Size: (D + 1)x(D + 1) | 1 | Up to N | Yes | Yes |

Each of the rows of the Table 1 corresponds to a network function that represents one optical switch type, such as a Type I ROADM, a Type II ROADM, a WSS, or an OXC. Each column of the Table 1 corresponds to an optical switch characteristic, such as a node degree, a number and size of subsystems per node, a number of add/drop ports, a number of add/drop channels, a colorless characteristic, and a multiple wavelength per port characteristic. The node degree may represent the degree of the NE in terms of the number of line side ingress and line side egress ports, as explained above. The number and size of subsystems per node may comprise the number of subsystems, such as optical switches, that can be combined or integrated in one NE or NE component, such as a chipset, and the size of each subsystem in terms of the total number of add ports, drop ports, and egress ports. The number of add/drop ports and the number of add/drop channels may comprise the total number of add ports and drop ports and the total number of add channels and drop channels connected to the ports at the NE, respectively. In Table 1, N may represent any integer number of add and drop ports and D may represent any integer number of degrees greater than two. Moreover, M may represent any integer number of add and drop ports and N may represent any integer number of add and drop channels connected to the add and drop ports at the NE and greater than M. For example, N may be equal to 32 or 40 channels, and M may be equal to four or eight ports.

The colorless characteristic may indicate whether the NE may support any or a plurality of variable wavelengths or, alternatively, one or a plurality of predetermined or specified wavelengths. As such, the NE may be colorless (labeled as Yes in Table 1) when the NE comprise colorless ports and may not be colorless (labeled as No in Table 1) when the NE comprise colored ports. The multiple wavelengths per port characteristic may indicate whether the NE's ports may support or forward a single wavelength at a time (labeled as No in Table 1) or a plurality of wavelengths at a time (labeled as Yes in Table 1).

As shown in Table 1, the Type I ROADM may comprise one line side ingress port and one line side egress port (degree of two), support one of a plurality of fixed wavelengths (not colorless), and forward one wavelength at a time. The Type II ROADM may have similar characteristics as the Type I ROADM with the exception that the Type II ROADM may be colorless. On the other hand, the WSS may have a degree of two or greater (D is an integer greater than two) and may forward a plurality of wavelengths at a time. The OXC characteristics may be similar to that of the WSS. However, the OXC may have a node degree greater than but not equal to two in addition to a smaller number of subsystems with larger sizes than that of the WSS.

Returning to FIG. 1, the NEs 112 may be coupled to each other via optical fibers, also referred to as links. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE protocol (PCEP) to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the WSON 110, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
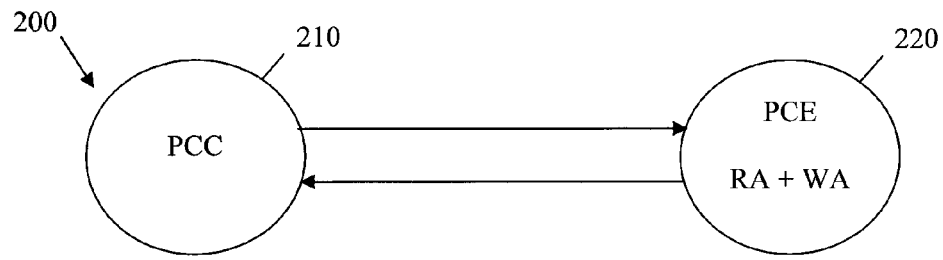
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
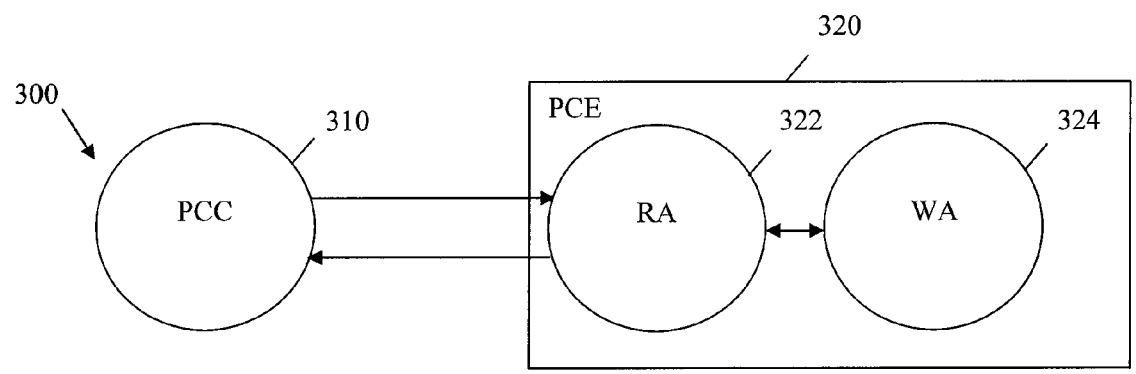
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
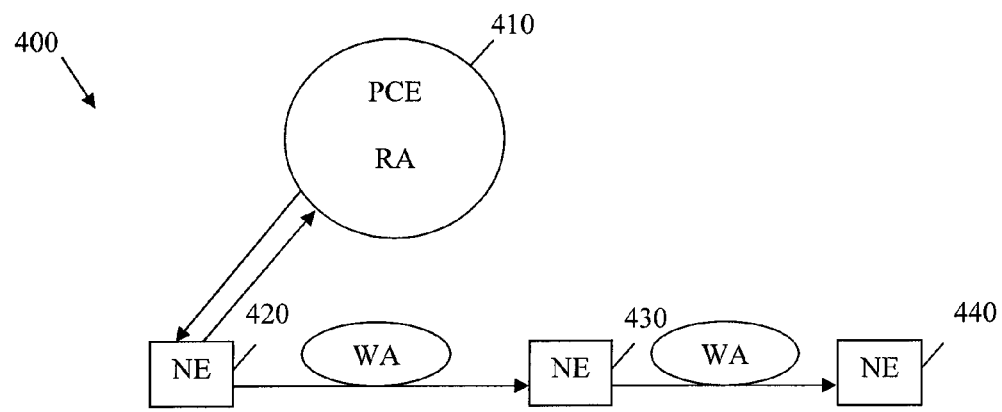
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
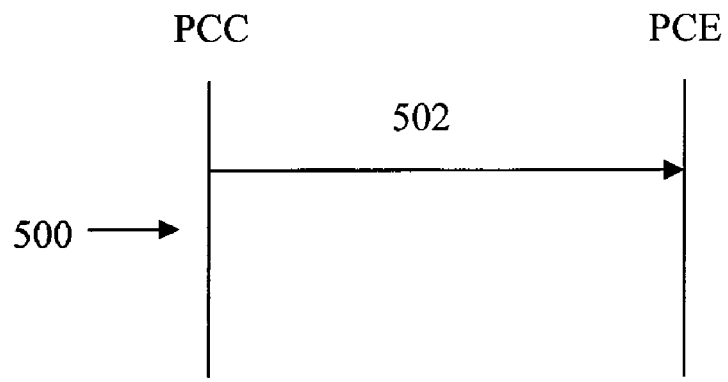
FIG. 5 is a protocol diagram of an embodiment of the communications between the PCC and the PCE.

FIG. 5 illustrates an embodiment of a communication method 500 between the PCC and the PCE. In the method 500, the PCC sends a message 502 to the PCE, where the message 502 comprises at least one of the RWA information described below. The message 502 may also contain a status indicator that indicates whether the RWA information is static or dynamic. In an embodiment, the status indicator may indicate how long the static or dynamic status lasts, so that the PCE can know how long the RWA information is valid and/or when to expect an update. Additionally or alternatively, the message 502 may contain a type indicator that indicates whether the RWA information is associated with a node, a link, or both.

The method 500 may be implemented using any suitable protocol, such as the IGP. The IGP may be a routing protocol used for exchanging route information among gateways, such as host computer or routers, in an autonomous network. Internet networks can be divided into multiple domains or multiple autonomous systems, where one domain congregates a batch of host computers and routers that employ the same routing protocol. In such a case, the IGP may be provided for selecting route in a domain. The IGP may be link-state routing protocol in that each node possesses information about the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, open shortest path first (OSPF), and intermediate system to intermediate system (IS-IS).

As mentioned above, the message 502 may comprise RWA information such as at least one port restriction. The port restrictions may indicate limitations regarding the connectivity of the NE's ports, the wavelengths supported by the NE's ports, or both. Specifically, the port restrictions may comprise a port connectivity information or data, a port wavelength restriction information or data, or both. Moreover, the port wavelength restriction information or data may comprise a number of wavelengths, a range of wavelengths, or both. In some embodiments, the port connectivity data or port wavelength restriction data corresponding to a plurality of ports may be forwarded for each port individually from the PCC to the PCE. Alternatively, the port connectivity or port wavelength restrictions for a plurality of ports may be combined together and then forwarded to the PCE.

In an embodiment, the port restrictions may be represented by a port restriction matrix. The port restriction matrix may comprise a plurality of rows and a plurality of columns. For instance, the port restriction matrix may be a wavelength restriction matrix comprising a plurality of rows and a plurality of columns corresponding to the number of wavelengths and the range of wavelengths. In another instance, the port restriction matrix may be a connectivity matrix comprising a plurality of rows and a plurality of columns corresponding to the individual ports of the NE.

The port wavelength restrictions may comprise the number of wavelengths, the range of wavelengths, or both. The number of wavelengths may indicate how many different wavelengths a port can simultaneously support or accept. For example, a port may be colored or colorless. The range of wavelengths may indicate the extent or the limitation on the wavelength range that the port can accept. In some embodiments, the wavelength restrictions may comprise a number of wavelengths or a range of wavelengths from a larger predefined or pre-established set of wavelengths or ranges of wavelengths that can be assigned to the port. In other embodiments, the port wavelength restrictions may comprise a complete set of wavelengths or ranges of wavelengths that may be assigned to the port.

For example, the number and range of wavelengths may represent multiple wavelengths selected from a full range of wavelengths, which may indicate that the port can accept a plurality of wavelengths simultaneously and is colorless in that it has no limitations on which wavelengths it can accept. Alternatively, the number and range of wavelengths may represent a single wavelength selected from a full range of wavelengths, which may indicate that the port can accept only one wavelength at a time, but is colorless in that it has no limitations on which wavelength it can accept. Further in the alternative, the number and range of wavelengths may represent a single fixed wavelength, which may indicate that the port can accept only one wavelength at a time and is colorful in that it is limited to a single wavelength. Moreover, the number and range of wavelengths may represent multiple wavelengths selected from a reduced range of wavelengths, which may indicate that the port can accept a plurality of wavelengths simultaneously and is limited in the wavelengths it can accept. Specifically, the port may be limited to a plurality of individual, discrete wavelengths or may be limited to a reduced range of wavelengths.

It will be appreciated that the port wavelength restrictions may be the same for all the ports at the NE or may vary from port to port. The port wavelengths restrictions may be static in that the number or range of wavelengths that a port can accept does not typically change once the port is configured. Alternatively, the port wavelength restrictions may be dynamic in that the number or range of wavelengths that a port can accept may be changed when the port is reconfigured.

In an embodiment, the port wavelength restrictions may be represented by the wavelength restriction matrix. The wavelength restriction matrix may comprise a plurality of rows and a plurality of columns corresponding to the number of wavelengths and the range of wavelengths, respectively, supported the port. Alternatively, the matrix columns and rows may be associated with the number of wavelengths and the range of wavelengths, respectively. For instance, the rows may represent the individual wavelengths a port can simultaneously accept, and the columns may represent the limitation on the wavelength range, such as, each column may be associated with a full wavelength range, a limited wavelength range, or a single wavelength range. Alternatively, the columns may represent the individual wavelengths supported by the port and the rows may represent the limitation on the wavelength range. The intersection of a row and column may constitute a cell element that indicates a port's wavelength and a wavelength range extent.

For example, for a colorless port that can accept a plurality of wavelengths simultaneously, the elements at the intersections of the matrix rows associated with the multiple wavelengths and the matrix column associated with the full wavelength range may be set to one while the remaining matrix elements may be set to zero. In another example, for a colorless port that can accept only one wavelength at a time, only the element at the intersection of the matrix row associated with that wavelength and the matrix column associated with the full wavelength range may be set to one. In another example, for a colorful port that can accept only one wavelength at a time, only the element at the intersection of the matrix row associated with that wavelength and the matrix column associated with the single wavelength range may be set to one. In another example, for a port that can accept a plurality of wavelengths simultaneously from a reduced range of wavelengths, the elements at the intersections of the matrix rows associated with the multiple wavelengths and the matrix column associated with the limited wavelength range may be set to one while the remaining matrix elements may be set to zero.

In the case of establishing the wavelength restriction matrix for one specific wavelength range, such as a full wavelength range, a limited wavelength range, or a single wavelength range, the matrix may be reduced to a column or a row matrix. Hence, the row or column matrix associated with the wavelength range may indicate the multiple wavelengths that the port can accept at that wavelength range. Similarly, when the port wavelength restriction data comprises the number of wavelengths but not the range of wavelengths, a row or column matrix may be established indicating the multiple wavelengths supported by the port.

In other embodiments, where the port wavelength restriction data may comprise the range of wavelengths without the number of wavelengths, a row or column matrix may be established, where each row or column may be associated with a wavelength range, such as a full wavelength range, a limited wavelength range, or a single wavelength range. In other embodiments the row or column matrices representing the number of wavelengths or the range of wavelengths may be combined for a plurality of ports into a single wavelength restriction matrix, where each row or column may correspond to an individual port.

The port connectivity may indicate the data links, lightpaths, optical connections, or other links that may be established between the ports of the NE. The port connectivity may reflect the connections without regard for port wavelength restrictions. The port connectivity may also reflect connections between the ports in a single direction, in two opposite directions, for example downstream and upstream, or regardless of a path flow direction. The port connectivity may be fixed or static when the connectivity between the NE's ports is fixed, such as the case of an optical switch or a FOADM. Alternatively, the port connectivity may be changeable or dynamic when the connectivity between the NE's ports is reconfigurable, such as the case of a reconfigurable NE or a ROADM.

In an embodiment, the port connectivity may be represented by the connectivity matrix. The connectivity matrix may comprise a plurality of rows and a plurality of columns corresponding to the individual ports of the NE. Specifically, the rows may represent the ingress ports, such as line side ingress ports and add ports, and the columns may represent the egress ports, such as line side egress ports and drop ports. Alternatively, the columns may represent the ingress ports and the rows may represent the egress ports. As such, the intersection of each row and column of the connectivity matrix may constitute a cell element that indicates the connectivity between the corresponding ingress port and egress port.

In the case of representing the connectivity information for a single port of the NE, the connectivity matrix may be reduced to a column or a row matrix. The row or column matrix associated with the port may comprise the total connectivity information of the port with respect to the remaining ports of the NE. In some embodiments, the connectivity matrix associated with a single port or a plurality of ports may correspond to a single wavelength or a single range of wavelengths supported by the port or ports of the NE. As such, a number of connectivity matrices may be used to represent the connectivity information associated with the number or range of wavelengths. Further, the connectivity matrix may correspond to a single path flow direction, such that one connectivity matrix may be used to represent the ports' connectivity information for unidirectional path flows, while two connectivity matrices may be used in the case of bidirectional path flows.

Figure 6:
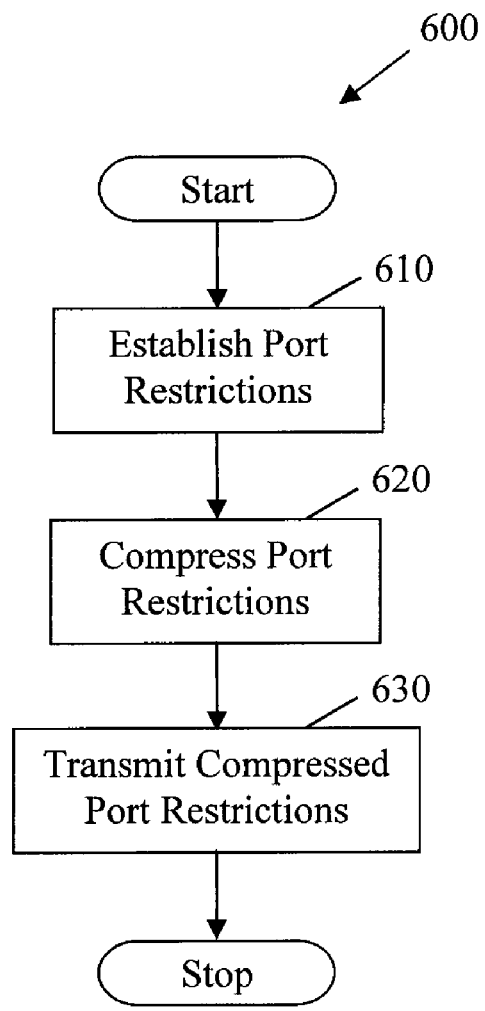
FIG. 6 is a flowchart of an embodiment of a port restriction processing method.

FIG. 6 illustrates one embodiment of a port restriction processing method 600. The port restriction processing method 600 may be implemented at the PCC in one of the RWA architectures 200, 300, or 400, described above. At block 610, the method 600 may represent the port restrictions for an NE, such as a ROADM. The port restrictions may comprise the port connectivity, the port wavelength restrictions, or both. The port wavelength restrictions may include a number of wavelengths, a range of wavelengths, or both. Each of the port restrictions may be embodied in a single matrix or multiple port restrictions may be combined in a single matrix.

At block 620, the method 600 may compress the port restrictions. For instance, the port restriction matrix may be compressed by grouping similar elements of each row or column. In an embodiment, the elements of each row (or column) equal to one may be represented by a group comprising the numbers of the elements' columns (or rows). Further, the rows corresponding to a common group of columns may be grouped. In some embodiments, the rows with the common group of columns may be represented by a group comprising the numbers or the range of the rows.

At block 630, the method 600 may forward the compressed port restrictions to a network entity, such as the PCE. If compressed, the port restrictions may be uncompressed and processed, for example in computing routing, wavelength assignment, or both. In other embodiments, the method 600 may be implemented without compressing the port restrictions at block 620. As such, the port connectivity may be represented using the connectivity matrix and the elements of the connectivity matrix may be forwarded along any established wavelength restrictions.

Figure 7:
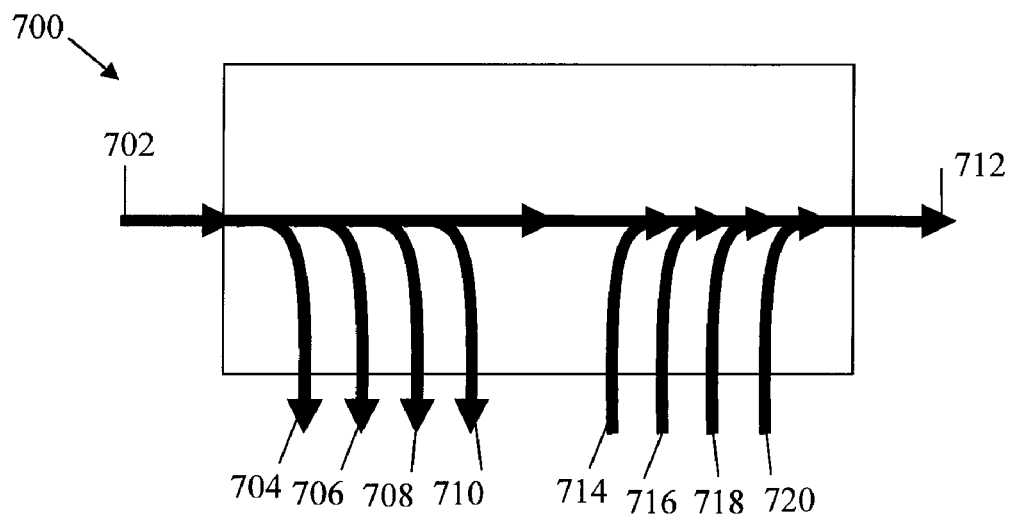
FIG. 7 is a schematic diagram of an embodiment of a reconfigurable optical add/drop multiplexers.

The representation of the port restrictions in a matrix and the compression of the port restrictions can be explained further using the port connectivity of a ROADM as an example. FIG. 7 illustrates one embodiment of a ROADM 700 that may constitute, reside in, or be coupled to one of the NEs in a WSON. The ROADM 700 may comprise a line side ingress port 702, four drop ports 704, 706, 708, and 710 coupled to the line side ingress port 702, a line side egress port 712 coupled to the line side ingress port 702, and four add ports 714, 716, 718, and 720 coupled to the line side egress port 712. The ROADM 700 may receive the optical signals from the line side ingress port 712 or any of the add ports 714, 716, 718, and 720, and transmit the optical signals on the line side egress port 712 or any of the drop ports 704, 706, 708, and 710. As such, the port connectivity for the ROADM 700 may be represented using a symmetrical connectivity matrix comprising five rows corresponding to the five ingress ports and five columns corresponding to the five egress ports, where each element of the matrix indicates the connectivity between ports. For example, a one could be used to indicate connectivity, while a zero could indicate a lack of connectivity. Such a matrix for the ROADM shown in FIG. 6 would be:

$$\begin{bmatrix} 1 & 1 & 1 & 1 & 1 \\ 1 & 0 & 0 & 0 & 0 \\ 1 & 0 & 0 & 0 & 0 \\ 1 & 0 & 0 & 0 & 0 \\ 1 & 0 & 0 & 0 & 0 \end{bmatrix}.$$

Alternatively, the ROADM 700 may be represented using the transpose matrix of the connectivity matrix above, where the five rows of the transpose matrix correspond to the five egress ports and the five columns correspond to the five ingress ports. However, since the connectivity matrix is symmetrical, the transpose matrix is equal to the connectivity matrix and the two representations are identical.

Further, the port connectivity may be compressed by grouping some of the elements of the connectivity matrix. For instance, in the case of the ROADM 700, the port connectivity may be compressed by grouping the elements of each row (or column) corresponding to an ingress (or egress) port into a single group. Specifically, the group may comprise the column (or row) numbers corresponding to each element equal to one of the row (or column). Hence, the port connectivity representation may be compressed using a plurality of groups equal to the number of rows (or columns) instead of the connectivity matrix representation. For a connectivity matrix with four, five, eight, 32, or 40 ingress and egress ports, for example, the number of elements in the groups may be substantially smaller than the number of elements in the connectivity matrix.

For example, the first row of the connectivity matrix above may correspond to the line side ingress port of the ROADM shown in FIG. 6 and comprise five ones, which may indicate connectivity between the line side ingress port and each one of the five egress ports of the ROADM. Hence, the port connectivity for the line side ingress port may be compressed by a group representation comprising the column numbers or the positions of the elements equal to one in the first row, such as {1,2,3,4,5}. The column numbers in the group also correspond to the individual egress ports connected to the line side ingress port. The elements of the remaining rows, corresponding to the remaining ingress ports, may be similarly compressed to obtain four more groups of column numbers. Since each row of the remaining rows comprises one element equal to one and located at the first column position, each corresponding group may comprise the same column number, i.e. {1}. Thus, the number of elements obtained in the five compressed groups is equal to nine, which is substantially smaller than the 25 elements or cells of the connectivity matrix. The compressed groups of column numbers are:

$$\left\{\begin{array}{c} 1,2,3,4,5 \\ 1 \\ 1 \\ 1 \\ 1. \end{array}\right.$$

Further, the port restrictions may be compressed by grouping the rows (or columns) that share a common group of column (or row) numbers. Specifically, the group of rows (or columns) may comprise the row (or column) numbers of each row (or column) that share a common group of columns (or rows). Hence, the port connectivity representation may be further compressed using a plurality of group pairs, each group pair comprising one group of row numbers indicating the individual ingress (or egress) ports and another group of column numbers indicating the egress (or ingress) ports connected to the ingress (or egress) ports.

For example, the five compressed group of column numbers for the ROADM of FIG. 6 shown above, may be further compressed into two group pairs. Since only the line side ingress port is connected to each of the five egress ports, the first group pair is represented such as {(1), (1,2,3,4,5)}. On the other hand, since each of the remaining four ingress add ports are connected to the line side egress port, the second group pair is represented such as {(2,3,4,5), (1)}.

Additionally, the port restriction may be further compressed by substituting the numbers of rows and columns in the group pairs with the ranges of rows and columns. For instance, in each group pair, one of the groups may comprise the first and last row number indicating the range of ingress ports, while the other group may comprise the first and last column number indicating the range of egress ports connected to the range of ingress ports. For example, the two compressed group pairs that represent the port connectivity of the ROADM of FIG. 6 may be further compressed by substituting the row and column numbers with the row and column ranges such as {(1), (1-5)} for the first group pair and {(2-5), (1)} for the second group pair. The number of elements in the compressed group pairs may be substantially smaller than the number of elements in the connectivity matrix as the number of ports increases.

Although the compression schemes or algorithms shown above are implemented for port connectivity data, the same schemes may be implemented for compressing any port restriction data. For instance, the port restrictions may be represented by a port restriction matrix. Accordingly, the port restrictions may be compressed by grouping the elements or the matrix rows (or columns) and further grouping the elements of the matrix columns (or rows). Alternatively, the port restrictions may comprise port wavelength restrictions, which may be represented using a wavelength restriction matrix. The port wavelength restrictions may similarly be compressed by grouping the elements or the matrix rows (or columns) and further grouping the elements of the matrix columns (or rows).

In another embodiment, the NE may be an asymmetrical optical component such as an asymmetrical ROADM, WSS, or OXC comprising a different number of ingress and egress ports. The port restrictions for the asymmetrical component may be represented using an asymmetrical matrix. For instance, the port restrictions may comprise port connectivity. The port connectivity may be represented by a connectivity matrix that comprises a number of rows corresponding to the number of ingress (or egress) ports and a different number of columns corresponding to the number of egress (or ingress) ports.

For example, in the case of an OXC with M ingress ports and N egress ports, where M and N are two different integers, the port connectivity may be represented using a connectivity matrix with M×N elements. The port connectivity may be compressed as shown above. Further, the OXC may have a full connectivity among the ingress and egress ports, which may be compressed using a single group pair. For instance, the first group may indicate the first and last ingress (or egress) ports, e.g. 1 and M, and the second group may indicate the first and last egress (or ingress) ports, e.g. 1 and N, and hence the compressed group pair representation may be {(1-M), (1-N)}. As such, the number of elements in the connectivity matrix M×N is substantially reduced.

It should be noted that the port restrictions data or information is compressed prior to forwarding the port restrictions to the PCE. However, when received by the PCE, the compressed port restrictions may be uncompressed to obtain the port restriction data prior to processing. To uncompress the port restrictions, the compression scheme or algorithm applied, may be stored at the PCE or forwarded along with the port restrictions.

Figure 8:
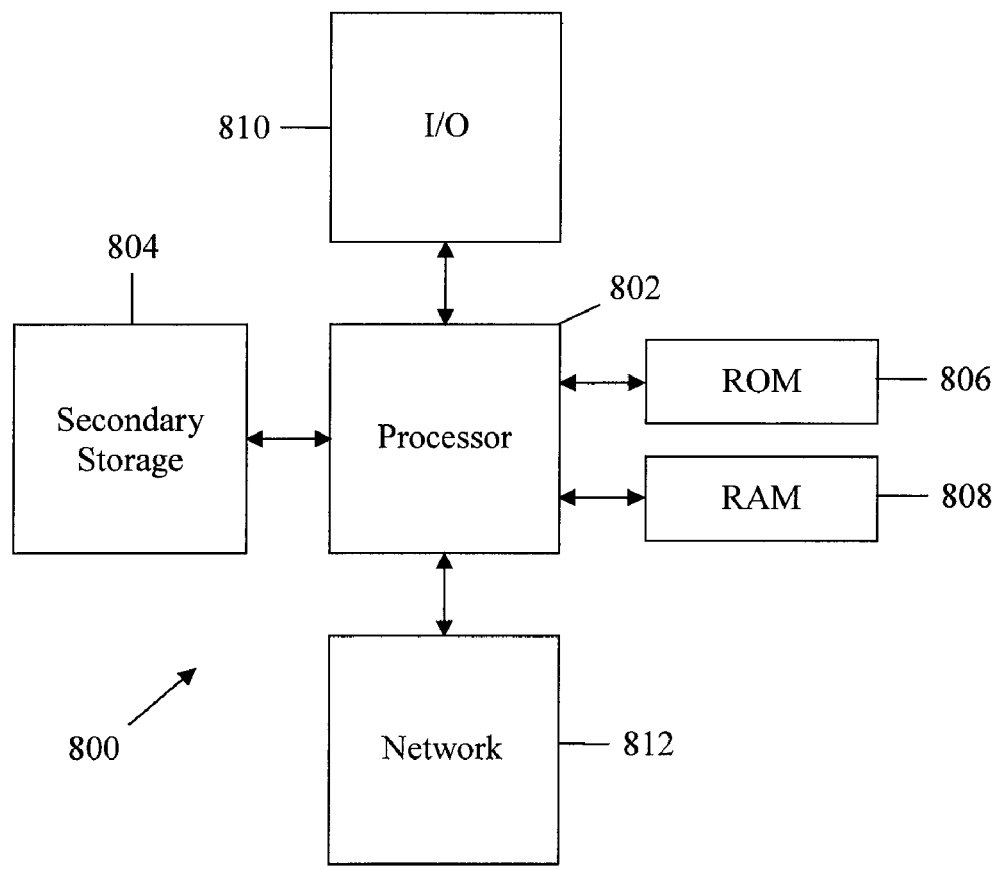
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

EXAMPLES

Link state routing models for packet switched networks feature non-blocking switching nodes and links with relatively simple attributes such as a metric used in shortest path route computations. The only state information kept concerning the link is its operational status, e.g., whether it is up or down. Features were then introduced into link state routing protocols to support the extended Quality of Service (QoS) features of Asynchronous Transfer Mode (ATM) and Multi-Protocol Label Switching (MPLS). These included link capacity constraints and current utilization state (bandwidth currently used and available). Though the link models increased in sophistication, the models for the switching nodes remained that of a simple idealized non-blocking switch fabric. The non-blocking assumption modeled the performance expected from a switch by a carrier. This approach carried over to the GMPLS control of Time-Division Multiplexing (TDM) networks such as Synchronous optical networking (SONET)/Synchronous Digital Hierarchy (SDH). In this case, many large TDM switches were implemented via re-arrangeably non-blocking fabrics but such techniques were hidden from the user of the switch via hitless rearrangement techniques. Hence, once again the switching model is extremely simple that requires no "node" state be remembered for path computation.

In WSONs, the path computation involves both route selection and wavelength assignment. In the case of limited or no wavelength converters, more detailed link state knowledge is needed to enable wavelength assignment. At a minimum, the available and used wavelength information is needed at each link. On top of this, some of the most popular and cost effective switching elements for use in WSONs, e.g., ROADMs, are highly asymmetrical switching devices.

One approach to generating a model for blocking or highly asymmetrical switching devices is to reveal the inner workings of the switch or multiplexer. Indeed, most if not all switching structures in common use today are assembled from a collection of non-blocking fabrics and capacity constrained links. In this disclosure, a method is presented for representing a broader class of switching devices.

The most basic aspect of an asymmetrical switching device is that not every ingress port can talk to every egress port. Let $C=\{c_{ij}\}$ denote the potential connectivity matrix which indicates whether a wavelength on ingress port $I_i$ can be connected to egress port $E_j$, i.e., $c_{ij}=0$ or 1. Let $W_j=\{W_{jk}\}$ be the wavelength usage state for egress port $E_j$, where $$w_{jk} = \begin{cases} 0 & \text{if } \lambda_k \text{ is not in use} \\ 1 & \text{if } \lambda_k \text{ is in use.} \end{cases}$$

Supposing switching a wavelength $\lambda_k$ on ingress port $I_i$ out of egress port $E_j$ is required. The first restriction of WSON networking is that wavelength $\lambda_k$ cannot already be in use on egress port $E_j$, i.e., $w_{jk}=0$ is required. The inclusion of additional egress port wavelength constraints can allow for the modeling of a number of practical WSON switching devices, such as a number of different types of ROADMs and their generalizations. The following per port constraints types will be demonstrated:
1. Wavelength set constraint: $\lambda_k$ is required to be an element of a set $\Lambda_j$ of permitted output wavelengths for egress port $E_j$. This set can be different for each port.
2. Cardinality restriction: the number of active wavelengths on an egress port is restricted. In equation form, $$\sum_k w_{jk} \leq M,$$

for egress port $E_j$.

In the following, the preceding formalism is used to model Type I and II ROADMs, WSS, a waveband based ROADM, and a higher degree ROADM (i.e., a system that has both OXC and ROADM features).

Figure 9:
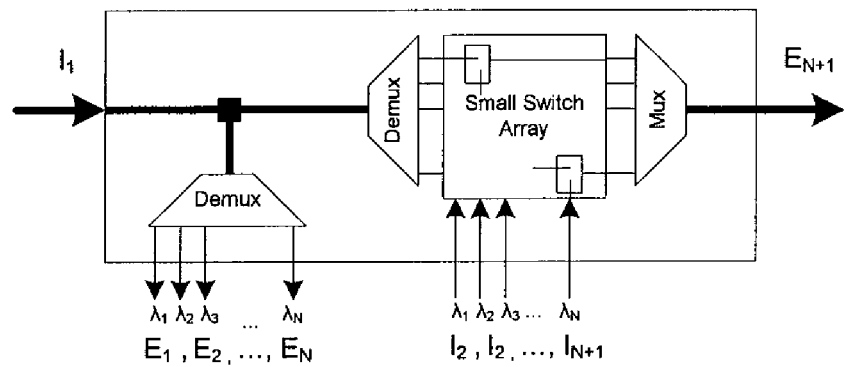
FIG. 9 is a schematic diagram of an embodiment of a type I optical add/drop multiplexer.

A type I ROADM is defined as possessing a line side ingress port, a line side egress port, and a multitude of colored drop ports. Note that this is actually "half" a ROADM since this structure is usually repeated in the opposite direction to for a "bi-directional" system. Multiple technologies can be used to realize such systems in particular wavelength blockers (WB) and small switch array (SSA) technologies. A diagram of one possible implementation of such a system based on a SSA is given in FIG. 9.

An implementation dependent method of modeling this ROAM would consist of two nodes for each of the demultiplexers with wavelength constraints on each demultiplexer output link, one node for the output multiplexer, N 2×2 switching nodes for each element of the SSA, and one node to represent the input splitter. Instead, this ROADM can be represented in general by the (N+1)×(N+1) connectivity matrix $$C = \begin{bmatrix} 1 & 1 & \cdots & 1 & 1 \\ 0 & 0 & \cdots & 0 & 1 \\ 0 & 0 & \cdots & 0 & 1 \\ \vdots & \vdots & \vdots & \vdots & \vdots \\ 0 & 0 & \cdots & 0 & 1 \end{bmatrix} \quad (1.1)$$

where the line side ingress port is labeled port $I_1$, the add ports are labeled $I_2, I_3, \ldots, I_{N+1}$ respectively, the drop egress ports are labeled $E_1, E_2, \ldots, E_N$ respectively, and the line side egress port is labeled $E_{N+1}$.

The (trivial) port wavelength constraints for the drop ports $E_j$ are:

$$\Lambda_j = \{\lambda_j\} \quad (1.2)$$

and $$\sum_k w_{jk} \leq 1 \quad (1.3)$$

Equation (1.2) tells us that the set of permissible wavelengths for this port consists of just one member (the definition of a colored port) and equation (1.3) is a redundant, in this case, cardinality constraint that tells us this is a single channel port.

Figure 10:
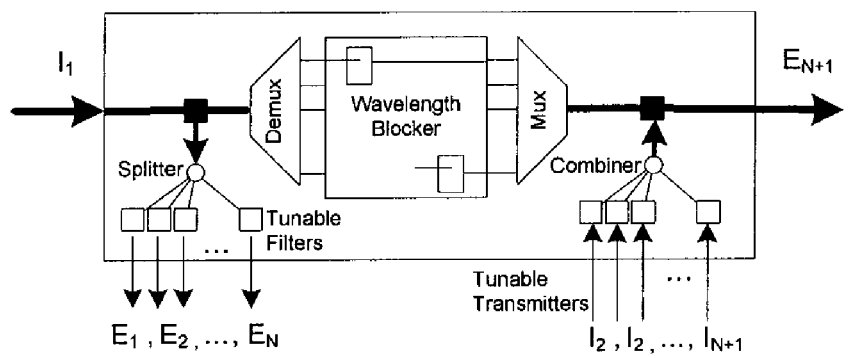
FIG. 10 is a schematic diagram of an embodiment of a type II optical add/drop multiplexer.

A type II ROADM is defined as possessing a line side ingress port, a line side egress port, and a multitude of colorless drop ports. However, these drop ports are restricted to carrying only a single channel. One possible implementation of a type II ROADM is shown in FIG. 10.

The potential connectivity matrix is given by equation (1.1). The port wavelength constraints for the drop ports $E_j$ are:

$$\Lambda_j = \{\lambda_1, \lambda_2, \ldots, \lambda_N\} \quad (1.4)$$

and $$\sum_k w_{jk} \leq 1 \quad (1.3)$$

Figure 11A:
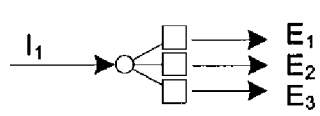
FIG. 11a is a schematic diagram of an embodiment of a fixed WSON subsystem.
Figure 11B:
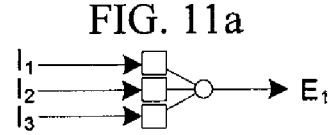
FIG. 11b is a schematic diagram of another embodiment of a fixed WSON subsystem.
Figure 11C:
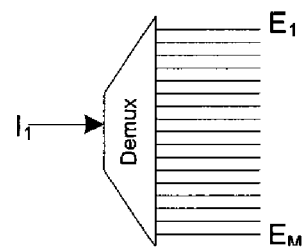
FIG. 11c is a schematic diagram of another embodiment of a fixed WSON subsystem.

In addition to reconfigurable devices, many fixed routing devices can appear in a WSON. These include splitters, combiners, and FOADMs. Although these are not under the control of the control plane, their presence can affect or dictate the choice of paths used to reach a destination. This fixed connectivity can be modeled with a fixed connectivity matrix $F=\{f_{ij}\}$ along with a set of fixed port wavelength constraints. For example, the splitter, combiner, and fixed demultiplexer of FIG. 11a, FIG. 11b, and FIG. 11c, respectively, can be specified by the following fixed connectivity matrices:

$$F_a = [1 \; 1 \; 1], F_b = \begin{bmatrix} 1 \\ 1 \\ 1 \end{bmatrix}, \text{and } F_c = [1 \; 1 \; \cdots \; 1]. \quad (1.6)$$

To tell the difference between a splitter and a demultiplexer, it is first noted that the splitter does not have any port wavelength constraints while the demultiplexer will have a set of egress port wavelength constraints equivalent to equation (1.2).

Most fixed WSON subsystems would not participate in the control plane and their presence would be inferred, e.g., from constraints on a receiving end system. However, some reconfigurable subsystems are better modeled as a combination of reconfigurable and fixed subsystems. To model such systems requires additional information and procedures. In particular, both a fixed and switched connectivity matrix can be required along with their respective port connectivity constraints.

Figure 12:
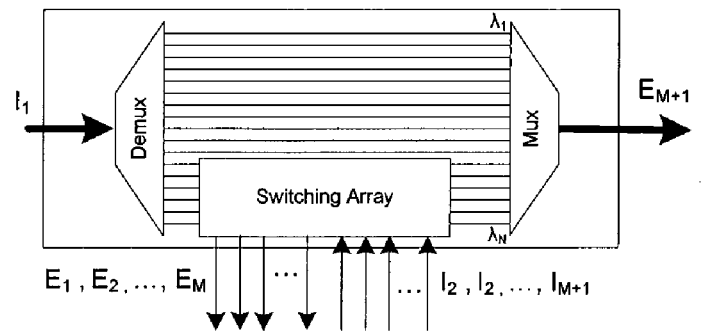
FIG. 12 is a schematic diagram of an embodiment of a type II optical add/drop multiplexer with additional constraints.

For example, a variant of a type II ROADM built from switching technology rather than a wave blocker that has additional constraints is shown in FIG. 12. Here, a switching array of dimension M is assumed, where M<N and N is the number of WDM channels on the line. Hence, only the capability to switch a subset of the wavelengths is possible. The connectivity matrix will have the same structure as equation (1.1), but will now have dimensions (M+1)×(M+1).

The port wavelength constraints for the drop ports $E_j$ are:

$$\Lambda_j = \{\lambda_{N-M}, \lambda_2, \ldots, \lambda_N\} \quad (1.7)$$

and $$\sum_k w_{jk} \leq 1 \quad (1.8)$$

To be explicit in modeling the pass through behavior of wavelengths $\lambda_1, \ldots, \lambda_{N-M-a}$, the fixed structure of FIG. 12 can be modeled with $$F = \begin{cases} f_{ij} = 1 & i = 1, j = M+1 \\ f_{ij} = 0 & \text{otherwise} \end{cases} \quad (1.9)$$

Along with the following fixed port constraint for $E_{M+1}$:

$$\Lambda_j = \{\lambda_1, \lambda_2, \ldots, \lambda_{N-M-1}\} \quad (1.10)$$

Figure 13:
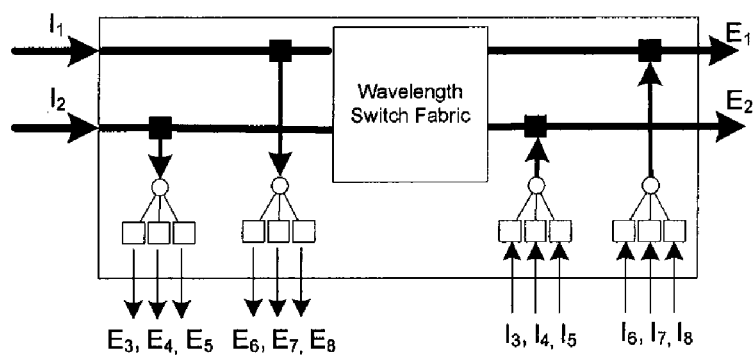
FIG. 13 is a schematic diagram of an embodiment of a higher degree optical add/drop multiplexer with per port add/drop.
Figure 14:
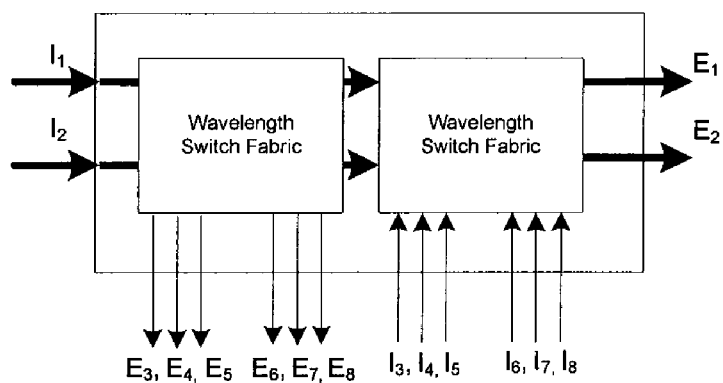
FIG. 14 is a schematic diagram of an embodiment of a higher degree optical add/drop multiplexer with per node add/drop.

The wavelength selective cross connects and higher degree ROADMs can be built from WSS elements. There are two different approaches to higher degree ROADMs. One based on per port add/drop, as represented in FIG. 13, and the other based on a per node add/drop, as represented in FIG. 14. The connectivity matrix for the ROADM of FIG. 13 is:

$$C_P = \begin{bmatrix} 1 & 1 & 0 & 0 & 0 & 1 & 1 & 1 \\ 1 & 1 & 1 & 1 & 1 & 0 & 0 & 0 \\ 0 & 1 & 0 & 0 & 0 & 0 & 0 & 0 \\ 0 & 1 & 0 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{bmatrix} \quad (1.11)$$

The connectivity matrix for the ROADM of FIG. 14 is:

$$C_N = \begin{bmatrix} 1 & 1 & 1 & 1 & 1 & 1 & 1 & 1 \\ 1 & 1 & 1 & 1 & 1 & 1 & 1 & 1 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \end{bmatrix} \quad (1.12)$$

For the ROADM of FIG. 12, a single connectivity matrix C along with port constraints was not sufficient to specify the behavior of the system. In this case, the fixed connectivity matrix F and additional fixed port wavelength constraints are needed to supplement this information. In general case, two ways may be used to model more complicated cases. The system can modeled as a collection of wavelength dependent connectivity matrices or with a set of internal nodes along with internal link constraints.

Figure 15A:
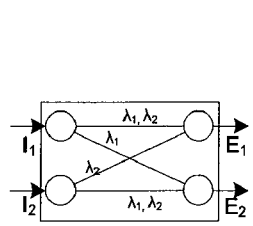
FIG. 15a is a schematic diagram of an embodiment of a WSON subsystem with multiple wavelength connectivity.

In FIG. 15a, a WSON system is shown with two ingress and two egress ports. It is represented internally by four switching nodes and four wavelength constrained links. The internal link from port $I_1$ to port $E_2$ only supports a single channel of wavelength $\lambda_1$ and the link from port $I_2$ to port $E_1$ only supports a single channel of wavelength $\lambda_2$. Our simplified model would come out with the following connection matrix:

$$C = \begin{bmatrix} 1 & 1 \\ 1 & 1 \end{bmatrix} \quad (1.13)$$

Figure 15B:
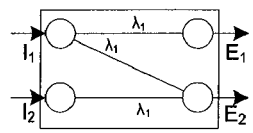
FIG. 15b is a schematic diagram of an embodiment of a WSON subsystem with a single wavelength connectivity.
Figure 15C:
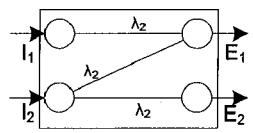
FIG. 15c is a schematic diagram of another embodiment of a WSON subsystem with a single wavelength connectivity.

Now the problem arises since both egress ports support the wavelength set $\{\lambda_1, \lambda_2\}$ and hence there is no way to tell from this description that $\lambda_2$ from $I_1$ cannot be switched to port $E_2$. Hence, the system of FIG. 15a cannot utilize our simplified representation. An equivalent representation in terms of wavelength dependent connection matrices can be derived from FIG. 15b and FIG. 15c where the wavelength dependent connectivity of the system is shown, which would lead to the wavelength dependent connectivity matrices:

$$C_{\lambda_1} = \begin{bmatrix} 1 & 1 \\ 0 & 1 \end{bmatrix} \text{ and } C_{\lambda_2} = \begin{bmatrix} 1 & 0 \\ 1 & 1 \end{bmatrix}. \quad (1.14)$$

Figure 16:
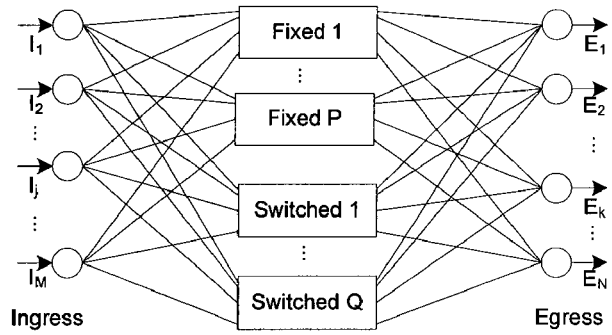
FIG. 16 is a schematic diagram of an embodiment of a WSON switch without wavelength converters.

Hence, previous method for representing WDM (WSON) switches is extended to allow multiple switched connectivity matrices along with their corresponding port/wavelength constraints. In general, an arbitrary WSON switch can be modeled without wavelength converters as shown in FIG. 16 where each "fixed block" and "switch block" is represented by its own connectivity matrix and its own set of port/wavelength constraints.

Given a connectivity matrix C and constraints, a model for use in a network graph can be constructed by, first of all, an algorithm for solving the RWA problem that will know how to deal with link constraints, since these are always present in one form or another. Our interest here is what to substitute into the overall WSON network graph for the switching subsystem based on the C matrix.

Figure 17A:
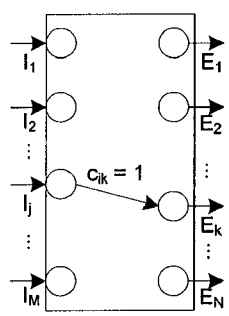
FIG. 17a is a schematic diagram of an embodiment of a bipartite subgraph.

The simplest approach to create a subgraph representing the connectivity of C is via a generic bipartite subgraph as shown in FIG. 17a. A bipartite graph is a graph whose set of nodes has been partitioned into two disjoint sets.

Figure 17B:
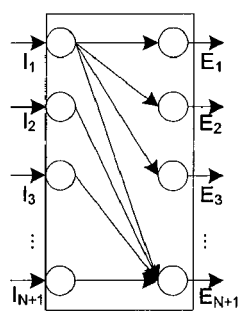
FIG. 17b is a schematic diagram of another embodiment of a bipartite subgraph.

Here, an internal node is added for each ingress and egress port and an internal link for each $c_{ik}=1$. Hence, the two sets of nodes of our bipartite graph correspond to the internal ingress and egress nodes respectively. In FIG. 17b, this generic realization approach is shown applied to the C matrix of equation (1.1). In this particular graph representation, where 2(N+1) internal nodes and 2N+1 internal links are added for a simple two degree and N-channel unidirectional ROADM, computation resources can be significantly wasted since path computation algorithms scale in terms of the number of nodes and links. In addition, most of the added nodes and links can be superfluous or redundant.

The connectivity matrix for ROADMs with a large number of add/drop as compared to line side ports will be sparse and hence standard sparse matrix techniques could be applied for efficient transmission. In the case of higher degree ROADMs, such as those shown above, this would be less than optimal. First, some of the connectivity matrices were not that sparse, and second, finding an efficient graph representation for use in path computation remains a problem.

One intuitively appealing approach to encoding the connectivity matrix is to break the switch down into the fewest largest non-blocking sub-switches possible. This corresponds to the problem of finding the minimum number of complete bipartite subgraphs that cover the corresponding bipartite graph of FIG. 17a. This is in general a computationally difficult problem, which only has guaranteed fast solution for restrictive graph classes. However, one can take advantage of knowledge of the WSON switches functionality or start with an efficient algorithm to list maximal bipartite subgraphs.

For instance, let I represent the set of all ingress ports, and E the set of all egress ports. Denote by $I_j \subset I$ a specific subset of the ingress ports, and $E_j \subset E$ a specific subset of the egress ports. As such, the matrix C can be represented via a complete bipartite cover, i.e., a collection of pairs of subsets of I and E with the requirement:

$$\{(I_j, E_j) | i_p \in I_j, e_q \in E_j \Rightarrow c_{pq} = 1\} \quad (1.15)$$

and $$\bigcup_j I_j = I, \bigcup_j E_j = E \quad (1.16)$$

Such a bipartite cover always exists. For example, let $I_j = \{I_j\}$ and the sets $E_j = \{e_k | c_{jk} = 1\}$, which is just a row compressed form for the matrix C and leads to the graph representation of FIG. 17a. Making the sets $I_j$ and $E_j$ "maximal" can reveal more of the structure of the switch for use in the graph representation and save space when passing this information via a control plane. Although this is generally a hard problem, current WSON switching elements implemented and proposed exhibit a great deal of relatively straight forward structure in their connectivity (but not necessarily their internal design) making the job of finding maximal sets $I_j$ and $E_j$ relatively straight forward as illustrated in the following examples.

In a first example, the two degree ROADM of FIG. 10 can be represented by the following two pairs: $(\{I_1\},\{E_1, E_2, \ldots, E_{N+1}\})$ and $(\{I_2,I_3, \ldots, I_{N+1}\},\{E_{N+1}\})$. In a second example, the per port add/drop higher degree ROADM of FIG. 13 can be represented by the following ingress/egress set pairs: $(\{I_1,I_2\},\{E_1,E_2\})$, $(\{I_1\},\{E_6,E_7,E_8\})$, $(\{I_2\},\{E_3,E_4,E_5\})$, $(\{I_3,I_4,I_5\},\{E_2\})$, and $(\{I_6,I_7,I_8\},\{E_1\})$. In a third example, the per node add/drop higher degree ROADM of FIG. 14 can be represented by the pairs: $(\{I_1,I_2\},\{E_1, E_2, \ldots, E_8\})$ and $(\{I_3,I_4, \ldots, I_8\},\{E_1,E_2\})$.

Given a compact representation, $(I_j,E_j)$, for the connectivity matrix C, a compact graph representation can be generated for use in path computation as follows:

1. Let each $(I_j,E_j)$ define a non-blocking internal switching node.
2. If ingress port $i_k \in I_j$ and $i_k \notin I_p$ for all $p \neq j$, then this ingress port can be directly attached to this switching block.
3. If egress port $e_k \in E_j$ and $e_k \notin E_p$ for all $p \neq j$, then this egress port can be directly attached to this switching block.
4. If ingress port $i_k \in I_j$ for more than one value of j, then a node with $i_k$ as ingress and with egress links is inserted to all other blocks such that $i_k \in I_j$.
5. If egress port $e_k \in E_j$ for more than one value of j, then a node with $e_k$ as egress and with ingress links is inserted from all other blocks such that $e_k \in E_j$.
6. Merging: internal nodes with only one egress or ingress link can be merged with their adjacent node.

Figures 18A, 18B, 18C:
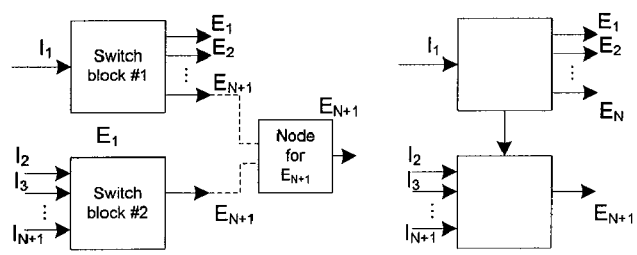
FIG. 18a is a schematic diagram of an embodiment of a graph representation for our two-degree optical add/drop multiplexer.
FIG. 18b is a schematic diagram of another embodiment of a graph representation for our two-degree optical add/drop multiplexer.
FIG. 18c is a schematic diagram of another embodiment of a graph representation for our two-degree optical add/drop multiplexer.

In a fourth example, given the compact encoding from the first example above, two switching blocks are created, as shown in FIG. 18a. The port $E_{N+1}$ is a common egress port to both blocks, add a node with $E_{N+1}$ as egress, and connect both these blocks to this node, as shown in FIG. 18b. Finally, nodes are merged where possible, as shown in FIG. 18c.

The conversion from this compact encoding to a minimal graph representation is a feature of our WSON switching system model and differs in a key way from that previously used in GMPLS routing. In GMPLS routing, information is associated with individual links in a switching subsystem, which would be possible for a row compressed encoding of the connectivity matrix. However, if such a mechanism was used, then the graph representation problem has to be solved again. Hence, for WSON switching systems, it would be better to introduce the compact encoding of the connectivity matrix as a new node wide attribute.

The extended WSON switch model shown above consists of possibly multiple fixed connectivity matrices and switched connectivity matrices along with associated port wavelength constraints. Both the connectivity matrices and the port wavelength constraints can be compactly represented. Furthermore, the compact representation given for the connectivity matrices leads to a minimal graph representation for use in path computation. As such, this model and its encodings are recommended for use in emerging WSON control plane standards.

The following references are incorporated herein by reference as if reproduced in their entirety:

1) J. Hui, *Switching and Traffic Theory for Integrated Broadband Networks*, Kluwer Academpic Publishers, 1990.
2) W. Imajuku et al., "Routing Extensions to Support Network Elements with Switching Constraint," July 2007; draft-imajuku-ccamp-rtg-switching-constraint-02.txt.
3) L. Eldada, "Advances in ROADM technologies and subsystems," 2005, pp. 611-620; http://adsabs.harvard.edu/abs/2005SPIE.5970..611E.
4) M. Feuer and D. Al-Salameh, "Routing power: a metric for reconfigurable wavelength add/drops," *Optical Fiber Communication Conference and Exhibit*, 2002. OFC 2002, 2002, pp. 156-158.
5) J. M. Tang and K. A. Shore, "Wavelength-Routing Capability of Reconfigurable Optical Add/Drop Multiplexers in Dynamic Optical Networks," *Lightwave Technology, Journal of*, vol. 24, 2006, pp. 4296-4303.
6) T. Goh et al., "Four-degree hub switch module using multichip planar lightwave circuit integration technology for transparent ROADM ring interconnection," *Optical Fiber Communication Conference*, 2006 and the 2006 National Fiber Optic Engineers Conference. OFC 2006, 2006, p. 3 pp.
7) P. Ghelfi et al., "Optical Cross Connects Architecture with per-Node Add & Drop Functionality," *Optical Fiber Communication and the National Fiber Optic Engineers.*

What is claimed is:

1. A network component comprising:
    a path computation client (PCC) that is part of a first optical network node of a wavelength switched optical network (WSON), wherein the PCC is configured to communicate with a path computation element (PCE) that is part of a second optical node of the WSON, wherein the first optical node and the second optical node are separated by an optical link, and wherein the PCC comprises at least one processor configured to:
    create a port restriction matrix comprising a plurality of port restrictions comprising port connectivity information, port wavelength restriction information, or both;
    compress the port restriction matrix using one or more compression algorithms; and
    forward the compressed port restriction matrix to the PCE over the optical link,
    wherein the PCE is configured to perform routing and wavelength assignment (RWA) operations between a plurality of network elements (NEs) in the WSON using the compressed port restriction matrix, and
    wherein compressing the port restriction matrix using one or more compression algorithms comprises compressing all of the port connectivity information, all of the port wavelength information, or both.

2. The network component of claim 1, wherein the port restriction matrix comprises a plurality of ones and a plurality of zeros, and wherein compressing the port restriction matrix using one or more compression algorithms comprises removing all of the zeros and indicating the location of all of the ones.

3. The network component of claim 1, wherein the port restriction matrix comprises a plurality of ones and a plurality of zeros, and wherein compressing the port restriction matrix using one or more compression algorithms comprises removing all zeros and indicating the location of all ones.

4. The network component of claim 1, wherein compressing the port restriction matrix using one or more compression algorithms comprises a first grouping of similar elements of each row or similar elements of each column, then a second grouping to create one or more group pairs, and then a third grouping to indicate ranges of elements in each group pair.

5. The network component of claim 4, wherein the port restriction matrix comprises a plurality of ones and a plurality of zeros, and wherein the first grouping comprises indicating either a column number or a row number of only the ones, or a column number or a row number of only the zeros.

6. The network component of claim 5, wherein the second grouping comprises creating one or more group pairs by indicating in each group pair either an element and all rows sharing that element in a common column or a plurality of common columns, or an element and all columns sharing that element in a common row or a plurality of common rows.

7. The network component of claim 6, wherein the third grouping comprises indicating a range of common columns for each group pair, indicating a range of common rows for each group pair, or both.

8. The network component of claim 1, wherein the port restriction matrix comprises port restrictions for a plurality of network elements along a lightpath.

9. A method comprising:
    establishing, by a path computation client (PCC) that is part of a node in a wavelength switched optical network (WSON), a port wavelength restriction data for an optical component;
    establishing, by the PCC, a port connectivity data for the optical components; and
    transmitting, by the PCC, the port wavelength restriction data and the port connectivity data through an optical connection to a path computation element (PCE) that is external to the PCC and performs routing and wavelength assignment (RWA) operations between nodes in a WSON based on the port wavelength restriction data and the port connectivity data,
    wherein the port connectivity data comprises current or potential connections between the optical component's ports, and wherein the port wavelength restriction data comprises the number of wavelengths supported by the optical component's ports, the range of wavelengths supported by the optical component's ports, or both.

10. The method of claim 9, wherein the optical component is asymmetrical and wherein the port wavelength restriction data and the port connectivity data are represented by an asymmetrical matrix.

11. The method of claim 9 further comprising determining whether a matrix representing at least one of the port wavelength restriction data and the port connectivity data can be compressed and, if so, compressing the entire matrix prior to said transmitting.

12. The method of claim 9, wherein the port wavelength restriction data, the port connectivity data, or both comprises a plurality of ones and a plurality of zeros, and wherein the port wavelength restriction data, the port connectivity data, or both are compressed prior to said transmitting by eliminating at least some of the zeros.

13. The method of claim 9, wherein the port wavelength restriction data comprises a number of wavelengths, a range of wavelengths, or both, for an asymmetrical switching device in which not every ingress port can communicate with every egress port.

14. The method of claim 9, wherein the port connectivity data consists of a connectivity matrix corresponding to an asymmetrical reconfiguration optical add/drop multiplexer (ROADM), an asymmetrical wavelength selective switch (WSS), or an asymmetrical optical cross connect (OXC).

15. The method of claim 9, wherein the port wavelength restriction data is based on a WSON switching device model having a set of per port constraints including a wavelength set constraint defining permitted wavelengths for an egress port and including a cardinality restriction defining a number of active wavelengths for an egress port.

16. The method of claim 9, wherein the port wavelength restriction data and the port connectivity data comprise port wavelength restrictions and port connectivity restrictions for a plurality of network elements.

17. An apparatus comprising:
a path computation client (PCC) configured to communicate data to a path computation element (PCE),
wherein the PCC is part of a node in a wavelength switched optical network (WSON),
wherein the PCE is located on a server that is external to the WSON and is coupled to the PCC node,
wherein the data comprises port restriction data in a port restriction matrix,
wherein the entire port restriction matrix is compressed using a compression algorithm and transmitted from the PCC to the PCE through an optical connection, and
wherein the PCE uses the port restriction data to perform routing and wavelength assignment (RWA) operations for the WSON.

18. The apparatus of claim 17, wherein the compressed port restriction matrix indicates connectivity between ports based on a WSON switching device model having at least some fixed subsystems and some reconfigurable subsystems.

19. The apparatus of claim 17, wherein the compressed port restriction matrix comprises at least one compressed wavelength restriction matrix corresponding to a fixed subsystem of a WSON switching device model and to a reconfigurable subsystem of the WSON switching device model.

20. The apparatus of claim 19, wherein the compressed wavelength restriction matrix indicates a number of wavelengths and a range of wavelengths.

21. The apparatus of claim 17, wherein the port restriction data comprises a first connectivity matrix that represents a fixed portion of a network element and a second connectivity matrix that represents a switched portion of the network element, wherein the first connectivity matrix is associated with a first wavelength constraint, and wherein the second connectivity matrix is associated with a second wavelength constraint.

22. The apparatus of claim 17, wherein the port restriction data comprises at least one fixed connectivity matrix, at least one switched connectivity matrix, or both, and wherein the port restriction data also comprises at least wavelength constraint for the fixed connectivity matrix, the switched connectivity matrix, or both.

23. The apparatus of claim 17, wherein the port restriction data is used to define a plurality of non-blocking switching nodes that are internal to the WSON.

24. The apparatus of claim 17, wherein the port restriction data comprises port restrictions for a plurality of network elements.

25. A method comprising:
representing, in a connectivity matrix, either a potential connectivity or a fixed connectivity for an asymmetric optical device comprising a plurality of input ports and a plurality of output ports;
storing a wavelength restriction matrix that models a plurality of wavelength restrictions that a link and an optical device impose on a port; and
sending the matrices from a network element (NE) node to a path computation element (PCE) node through an optical link,
wherein the connectivity matrix and the wavelength restriction matrix are part of a routing and wavelength assignment (RWA) operation in a wavelength switched optical network (WSON).

26. The method of claim 25, wherein the connectivity matrix indicates which ingress ports and wavelengths are connectable to a particular output port without representing any particular internal blocking behavior.

27. The method of claim 25, wherein the asymmetric optical device is an optical cross connect (OXC), a reconfigurable optical add/drop multiplexer (ROADM), or a waveband multiplexer.

28. The method of claim 25, wherein the connectivity matrix exhibits structure that allows for compact representations that are useful for both transmission and path computation.

29. The method of claim 25, wherein the connectivity matrix comprises port restrictions for a plurality of network elements.

30. The method of 25, wherein the wavelength restrictions are specified relative to the port or to a connectivity matrix.

* * * * *

UNITED STATES PATENT AND TRADEMARK OFFICE
CERTIFICATE OF CORRECTION

| | | |
|---|---|---|
| PATENT NO. | : 8,249,451 B2 | Page 1 of 1 |
| APPLICATION NO. | : 12/169883 | |
| DATED | : August 21, 2012 | |
| INVENTOR(S) | : Young Lee and Greg Bernstein | |

It is certified that error appears in the above-identified patent and that said Letters Patent is hereby corrected as shown below:

Column 24, line 48, claim 30 should read, "The method of claim 25, wherein the wavelength restrictions are specified relative to the port or to a connectivity matrix."

Signed and Sealed this
Second Day of October, 2012

David J. Kappos
*Director of the United States Patent and Trademark Office*